Jan. 31, 1956  A. H. BORMAN, JR  2,732,732
TRANSMISSION CONTROL SYSTEM
Filed Oct. 30, 1952  4 Sheets-Sheet 1

Inventor
August H. Borman, Jr.
By Willits, Helwig & Baillio
Attorneys

Jan. 31, 1956    A. H. BORMAN, JR    2,732,732
TRANSMISSION CONTROL SYSTEM
Filed Oct. 30, 1952    4 Sheets-Sheet 3

Inventor
August H. Borman, Jr.
By
Willis, Helmig & Baillio
Attorneys

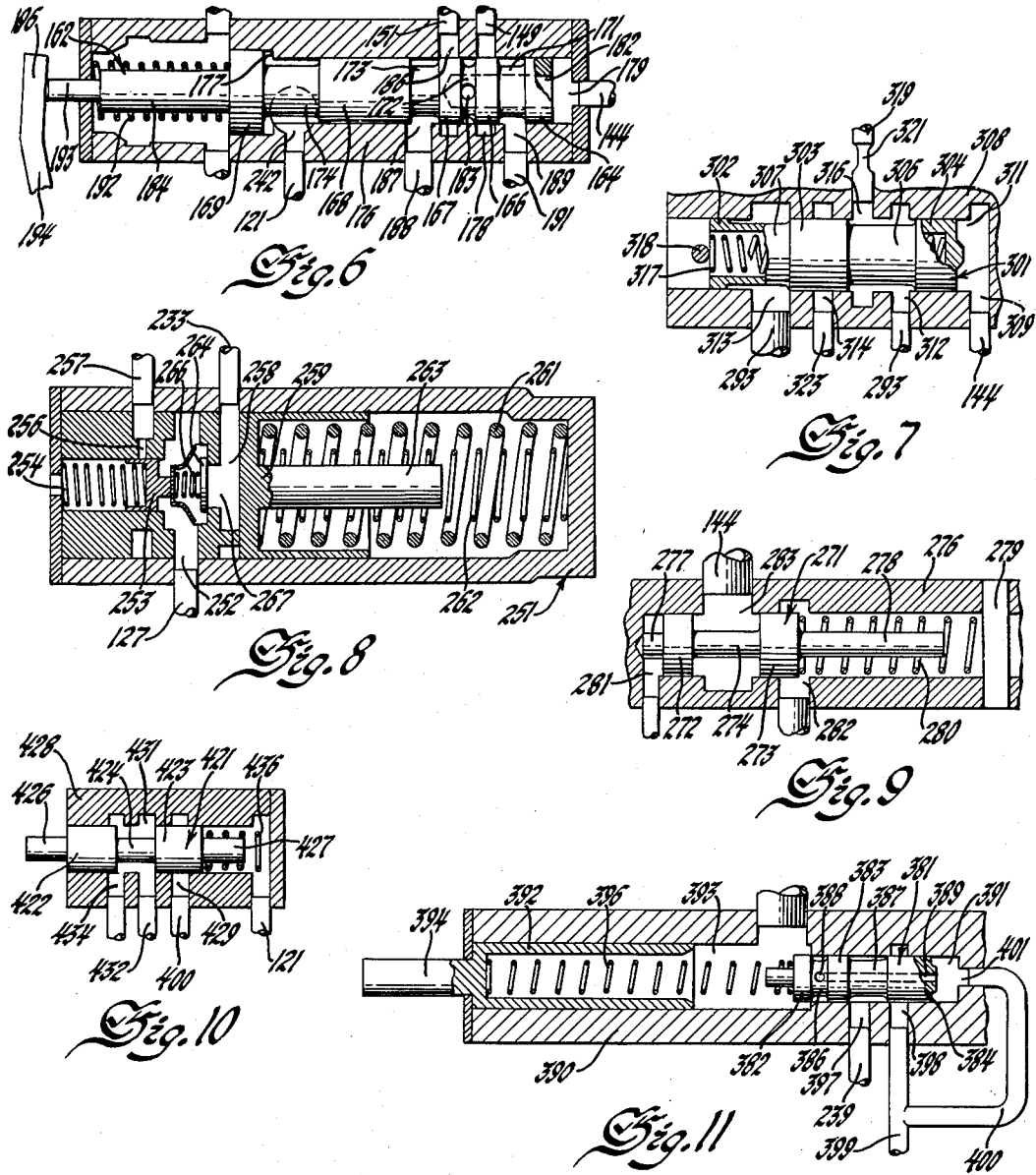

United States Patent Office 2,732,732
Patented Jan. 31, 1956

2,732,732

TRANSMISSION CONTROL SYSTEM

August H. Borman, Jr., Detroit, Mich., assignor to General Motors Corporation, Detroit, Mich., a corporation of Delaware Application October 30, 1952, Serial No. 317,710

25 Claims. (Cl. 74—732)

The present invention relates to an automatic transmission of the type which includes a fluid torque converter serially connected with step ratio gearing.

This invention involves a transmission which in the normal course of operation includes simultaneous torque multiplication in both the fluid torque converter and in the step ratio gearing mechanism with means for automatically by-passing the converter and gearing and directly coupling the vehicle engine to the transmission output shaft.

In particular the present invention relates to the means for controlling automatically the transition from converter and gear drive to direct drive and vice versa.

In the past, fluid torque converter type transmissions have commonly provided all the automatic transmission torque multiplication in the converter alone with a gearset usually combined to provide manually controlled reverse and low drives. In this type of transmission, drive is always through the converter which as torque multiplication requirements diminish normally then functions as a common fluid coupling.

The common criticism of this type of transmission has been that the power, i. e. torque multiplication, available from a reasonable size fluid torque converter is insufficient for reasonably rapid acceleration without undue engine speeds. That is to say, to provide rapid acceleration, either from a standstill or when underway, the engine must be run at full power with the result that the engine runs ahead of transmission output which gives the driver the sensation that the engine is unduly laboring to satisfy his demand.

The elasticity in power transmission which is manifest with a fluid coupling or fluid torque converter in a power train is advantageous when initiating drive. However, once the vehicle is underway the cushion or elasticity provided by a fluid coupling member is not as important and many operators would prefer instead the solid feel of an engine mechanically connected to the drive wheels rather than the soft or mushy response of a fluid coupling to throttle actuation.

It is to eliminate these frequently recurring criticisms, to wit, insufficient acceleration and non-rigid drive when underway, inherent in what might be termed the pure fluid torque converter drives that buid torque converters have been combined with automatically shiftable gearsets and devices for directing coupling the engine to the driving wheels.

It is generally an object of the present invention to provide a control system for automatically controlling the shifting of such a gearset as well as to automatically control the direct coupling of an engine to a transmission tailshaft.

It is an object of the invention to provide a transmission control system which includes a tailshaft driven pump adapted to function alternatively as a speed responsive governor or simply as a source of fluid under pressure not directly related to speed. It is also an object to provide a control system which includes a first fluid pressure system supplied by an engine drive pump, a second fluid pressure system supplied by a tailshaft driven pump and means controlled by said first system for connecting said second system with the first system.

It is another object of the invention to provide a transmission having hydraulically actuated ratio changing devices, a first fluid pressure system supplied by an engine driven pump for supplying fluid pressure to said devices and lubricant to the transmission, a second fluid pressure system supplied by a tailshaft driven pump for controlling the actuation of said ratio changing devices in response to vehicle speed and means controlled by the first system to connect said second system to said first system upon a failure of pressure in the first system. It also is an object of the invention to provide such a fluid pressure system in which a tailshaft driven pump is adapted to discharge through an orifice to provide fluid pressure proportional to the speed of the vehicle. Further it is intended to provide means intermediate said pump and said orifice to block flow through the orifice and direct said flow to said first fluid pressure system upon the loss of pressure in said first system.

It is also an object of the present invention to provide an hydraulic control system for an automatic transmission including a variable capacity pump which responds to its own self-delivered pressure to vary its own pumping capacity and control means for modifying the self-delivered pressure effect in varying pump capacity. The control means including a valve shiftable between a first position in which pump capacity is increased and a second position in which pump capacity is decreased, resilient means biasing the valve to its first position, while pump pressure urges the valve to the second position, a vacuum operated device acting on the resilient means to reduce the force thereof, and manually controlled means to maintain said valve in said first position. It is also an object to provide an hydraulically actuated clutch for coupling the vehicle engine to the tailshaft and a passage connecting said clutch with said valve whereby clutch pressure tends to move said valve to reduce pump pressure.

It is a further object of the present invention to provide a motor vehicle power transmission mechanism having a plurality of speed ratio controlling devices, a fluid pressure operated means for selectively operating said devices, a pump for supplying fluid under pressure to said pressure operated means, the pump being of the type which responds to its own self-delivered pressure to vary its own pumping capacity, control means for modifying the self-delivered pressure effect, the control means including a valve shiftable between a first position in which pump capacity is increased and a second position in which pump capacity is decreased, resilient means biasing the valve in its first position, pump output pressure urging said valve to its second position, a vacuum operated device acting on said said resilient means to reduce the force thereof and an hydraulic modulator adapted to maintain said valve in said first position upon the application of one of said controlling devices. It is also an object of the invention to provide means responsive to the speed of the vehicle to render the hydraulic modulator inoperative. An additional object is to provide a transmission control system in which one ratio controlling device provides a reduction drive and another ratio controlling device provides direct drives, an hydraulic modulator adapted to maintain the above-mentioned valve in said first position in reduction drive and means adapted to render the hydraulic modulator inoperative in direct drive. It is a further object to provide a manually controlled member for independently actuating the hydraulic modulator.

While certain general objects have hereinabove been set forth other objects will be readily apparent from the drawings and description which follow.

In the drawings:

Figure 6 is a detail of the pressure regulator valve.

Figure 7 is a detail of the tow valve.

Figure 8 is a detail of the low-reverse accumulator.

Figure 9 is a detail of the pop-off valve.

Figure 10 is a detail of the downshift or detent valve.

Figure 11 is a detail of the throttle valve.

Figure 1:
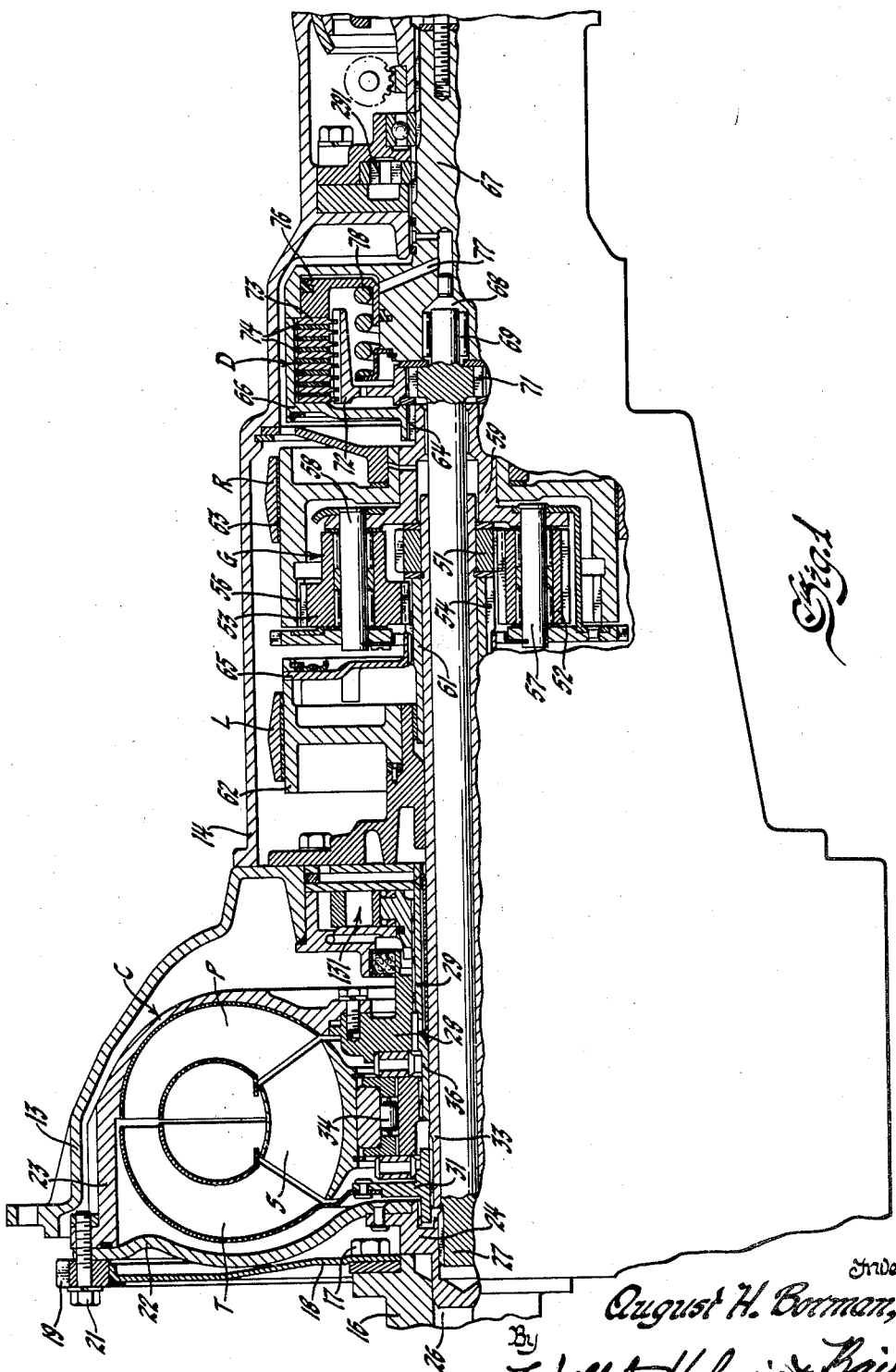
Figure 1 is a partially cut-away sectional view of an automatic transmission having a torque converter and a planetary gearset.

Referring to the drawings, it will be seen, in Figure 1, that the subject automatic transmission includes a three element fluid torque converter C, and a compound planetary gearset G in series with the converter. The transmission is contained in a two-part member which includes a converter bell housing 13 and a gearing housing 14.

A transmission input shaft 16 is bolted at 17 to a vibration dampener plate 18 which is, in turn, peripherally secured to support ring 19. Ring 19 is secured through studs 21 to converter casing members 22 and 23. Thus the drive from shaft 16 is transmitted through dampener 18 to rotate members 22 and 23 at engine speed. Converter member 22 is centrally secured to a hub 24. Hub 24 is piloted within a hollow portion 26 of the input shaft and is internally splined to an intermediate shaft 27 which is in effect an extension of and is driven at the same speed as input shaft 16. Fixed internally of converter member 23 is a converter pump or impeller P which is driven at engine speed. Impeller P is bolted to a hub 28 which is in turn splined to and drives a pump drive shaft 29. The impeller imparts vortical and rotary flow to the converter fluid to drive a converter output or turbine member T. Turbine member T is secured to a turbine hub 31 which is splined to a converter output shaft 33. Shaft 33 is coaxially disposed relative to shaft 16 and provides the power input to the planetary gearset G.

Intermediate the impeller and turbine elements of converter C is a stator or reaction member S. As is common in fluid torque converters, the reaction member redirects the converter fluid which leaves the turbine member so as to re-enter the impeller in a direction which supplements the driving effort of the latter. To prevent interference by the stator when the converter has passed from a torque multiplying stage to a simple fluid coupling stage, the stator is mounted upon a one-way brake 34. Brake 34 is grounded to the transmission housing through a sleeve 36. During torque multiplication in the converter, the fluid from the turbine T strikes the front of the stator blading under which circumstance the brake grounds the stator to the housing and prevents its reverse rotation relative to P and T. As the turbine accelerates, fluid begins striking the stator blades on the back side causing the stator to overrun in the direction of turbine and impeller rotation so as not to interfere with the functioning of the incipient fluid coupling.

Also mounted within the converter housing 13 is an engine driven pump 131. The pump is driven by sleeve 29 which, as noted, is driven at engine speed by impeller P. As will hereinafter be seen, this pump supplies fluid under pressure for control of the transmission as well as for supplying fluid to the converter and lubricant to the transmission in general.

The gearing, per se, in planetary gearset G is the same as that shown and described in Kelley Serial No. 83,618, filed March 26, 1949, and reference may be made thereto for a more detailed description than is required in the present instance.

Generally, the gearset is of a compound type which includes two sun gears, two sets of planetary pinions and a single output carrier. A first sun gear 51 is fixed to the converter output shaft 33 and meshes with a set of planetary pinions 52. Pinions 52 are referred to as the long pinions because they must be wide enough to not only mesh with sun gear 51, but also to mesh with a second set of planet pinions 53. Pinions 53, referred to as the short pinions, mesh with a second or reaction sun gear 54 as well as with an annulus or reversing gear 56. Both sets of pinions through their respective sets of shafts 57 and 58 are connected to and are adapted to drive a planet carrier 59.

The reaction sun gear 54 is mounted on one end of a sleeve 61. Sleeve 61 is keyed to a low brake drum 62 through an intermediate member 65. A brake or low band L is adapted to be applied or released to stop or permit the rotation of brake drum 62. Thus with sun gear 51 driving pinions 52 and 53 and band L applied to drum 62 to prevent rotation of sleeve 61, short pinions 53 will react or walk about the stationary sun gear 54 and thereby drive the planetary carrier at a reduced speed. With the low band released the gearset may be neutralized.

Planet carrier 59 is splined at 64 to a clutch casing 66 fixed to or integrally formed on a transmission output shaft 67. Consequently, with band L applied, carrier 559 and transmission output shaft 67 will be driven at reduced speeds.

When gear reduction or torque multiplication through the gearing or converter is no longer required for satisfactory performance, means has been provided for directly coupling the engine to the transmission output shaft 67. By thus avoiding the flow of power through the hydraulic coupling the inherent power losses therein are avoided as well as providing the operator with the customary solid feel of a non-fluid drive in response to throttle actuation.

A clutch D is provided to achieve the aforementioned direct drive lockup. As noted above, shaft 27 is in effect directly connected at one end to input shaft 16 and thus rotates at engine speed. The other end of shaft 27 is piloted in a hollow portion 68 of output shaft 67 and supported therewithin on roller bearings 69. Shaft 27 is splined or otherwise formed at 71 to carry for rotation therewith a clutch hub 72 having a series of clutch plates 73 peripherally mounted thereon. Plates 73 are adapted to engage with similar plates 74 on clutch casing 66. A clutch servo 76 is mounted within the clutch casing and when fluid pressure is admitted to the servo chamber through a passage 77, the servo forces plates 73 and 74 into engagement. The hydraulic control system is such that when clutch D is applied, the low band L is released and vice versa. Therefore, with clutch D applied, shaft 27 takes over the drive and clutch casing 66 and hence output shaft 67 are driven directly from engine shaft 16. When fluid pressure is exhausted from servo 76, a spring 78 moves the servo to release the clutch.

To provide a control force for the automatic shifting of the transmission in response to vehicle speed, a pump 291 is disposed at the rear of the transmission and is adapted to be driven by the output shaft 67. Pump 291 is also designed to provide main line pressure for lubrication purposes when and if the vehicle is being towed with a dead engine.

CONTROL SYSTEM

Figure 2:
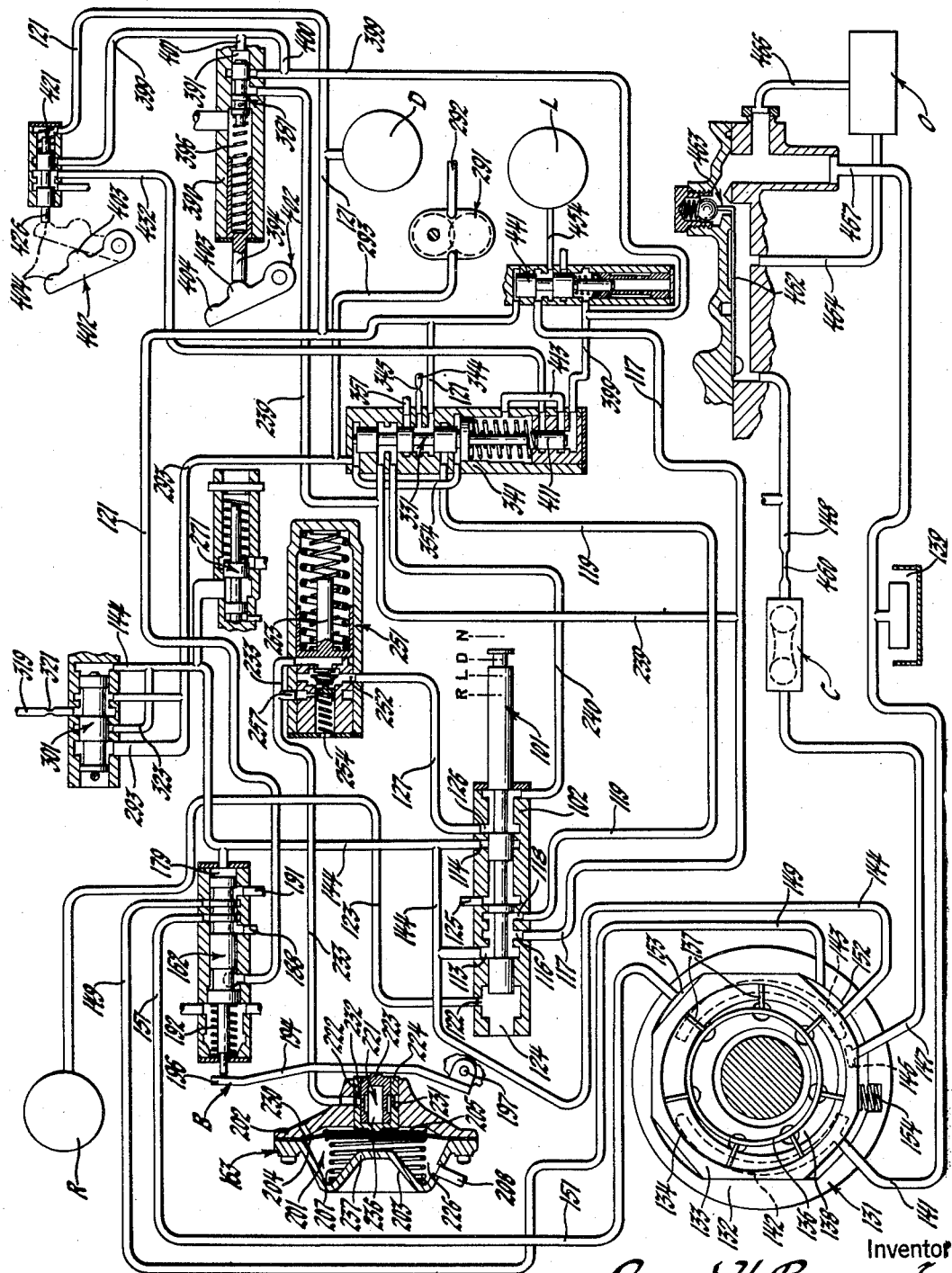
Figure 2 is a schematic showing of the transmission control system.

The mechanisms for manually and automatically controlling the various operating phases, including neutral, drive, low and reverse, of the transmission are shown in Figure 2 and will be hereinbelow considered.

*Manual valve*

Figure 5:
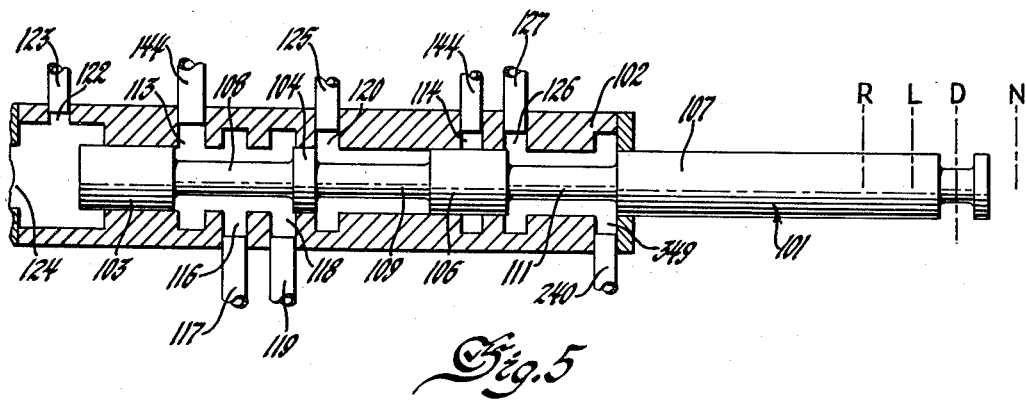
Figure 5 is a detail of the manual valve.

In order to provide the operator with a master control with which to condition the automatic transmission for drive, low or reverse operation as well as neutral, a manual selector lever, not shown, is mounted on the vehicle steering column. The selector lever, through a suitable linkage, controls the movement of a manual valve 101 shown in Figures 2 and 5. The valve is slidably mounted in a ported valve casing 102 and includes a plurality of lands 103, 104, 106 and 107 intermediate of which are valve portions 108, 109 and 111 of reduced cross-section. The output from engine pump 131 is supplied to passage 144 which delivers main line pressure to casing ports 113 and 114 which alternatively or jointly supply pressure to various outlet ports in the casing. A port 116 communicates with a low band supply passage 117. Port 118 feeds main line pressure to a shift valve 331 through a passage 119 which ultimately supplies pressure to a clutch supply passage 121. Port 122 exhausts the reverse band supply passage 123 through an opening 124 in the valve casing until the manual valve is shifted to the left so that land 103 blocks opening 124 at which time main line pressure is admitted to the passage 123 around reduced valve portion 108. Port 126 supplies main line pressure to a reverse-low accumulator through a passage 127. The manual valve will be hereinafter further described in relation to various of the hydraulic devices supplied thereby.

*Front pump*

It is apparent that the demands on the main line pressure in an automatic transmission will vary depending on vehicle operating conditions. In particular, the line pressure required to maintain a planetary clutch or brake in a non-slipping condition will vary with the torque being impressed on such a member. For example, when an operator desires to accelerate a vehicle a greater force is required to hold the clutch or brake against slippage due to the increased engine torque than is required during normal cruising or operating conditions. Similarly when the operator conditions the transmission for a low speed-high torque operation, as when in low or reverse, high line pressure is required to prevent slipping a brake.

Thus in a transmission utilizing clutch and brake controlled planetary gearsets, it is necessary to either provide a fluid pressure system designed to continuously supply fluid at a pressure level compatible with non-slipping operation of clutches and/or bands under maximum torque conditions or, in the alternative, to provide a system of varying pressure levels automatically selected in accordance with the momentary requirements of the system.

Since the greatest percentage of driving is done at moderate speeds, i. e. moderate engine torque output, it is inefficient to continuously operate a pump at its maximum pressure level when such pressure is required only during a small percentage of the overall operating time of the vehicle. Therefore, the present transmission engine driven pump 131, which supplies the fluid pressure to actuate the friction grip devices, is of the variable capacity type and is designed to modulate line pressure in accordance with its own self-delivered pressure as well as with the various operating requirements of the engine and transmission.

The variable capacity pump 131 includes a stationary casing 132 and a control ring 133 slidably supported within said casing. The control ring 133 has a cylindrical inner face 134. Concentrically disposed within said casing is a cylindrical rotor 136 having a plurality of radially movable blades 137 projecting therefrom. The rotor is adapted to be driven in any well known manner, such as that shown in Figure 1, from the vehicle engine.

The space between the rotor 136 and control ring 133 defines a pumping chamber 138. It is well known with pumps of this type that as the relative eccentricity between control ring and rotor increases, the pump output increases proportionately. Conversely stated, when the inner cylindrical surface 134 of the control ring is concentric with the rotor, the pump will be in a non-pumping condition. Blades 137 are adapted to continuously radially engage the inner surface 134 of the control ring and as a consequence they are radially movable relative to rotor 136. The radial relationship between ring and blade is that of cam and follower, thus a pumping seal is continuously maintained between the blades and the ring.

As seen from Fig. 2, the suction or input side of the pump is at the left and fluid is drawn from a sump 139 through a supply passage 141. The fluid from passage 141 is delivered to a suction chamber 142 in the casing and from whence it is supplied to pumping chamber 138. As the rotor and blades rotate in a clockwise direction, the fluid is carried to the output or right-hand side of the pump. Fluid under pressure is delivered to an output chamber 143 which feeds fluid under pressure to main line pressure supply passage 144. Also located on the output side of pump 131 is a chamber 146 which supplies fluid under pressure to a passage 147. Passage 147 supplies fluid to converter C and thence to the lubrication system via passage 148.

To vary the eccentricity of control ring 133 relative to rotor 136 and thereby to vary pump output pressure, control pressure from a control mechanism, to be described hereafter, is alternatively supplied to either passage 149 or passage 151. If the transmission control system requires a high line pressure, fluid is admitted to passage 149 which supplies pressure to a chamber 152 defined by casing 132 and the bottom portion of control ring 133. The fluid pressure in chamber 152 moves the control ring upwardly so as to increase the pump eccentricity which in turn increases the pump output.

If, on the other hand, the pump output pressure exceeds the requirements of the transmission control system, then passage 149 is exhausted and fluid pressure is admitted to passage 151. Passage 151 communicates with a chamber 153 defined by casing 132 and the upper portion of control ring 133. The fluid pressure in chamber 153 moves the control ring downwardly diminishing the relative eccentricity between the control ring and rotor and thus reducing pump output pressure. To prevent the control ring from being in a concentric or non-pumping condition when the engine is started, a means is provided to insure that the pump will have an initial eccentricity. For this purpose a light spring 154 is seated in the lower portion of casing 132 and biases against the control ring 133 which maintains the pump in a pumping condition when the other control forces are absent. In this way main line pressure will always be available to the transmission control system as soon as the engine is started.

By reducing the pumping effort required of pump 131, as noted above, an unproductive portion of the horsepower load is removed from the engine resulting in better overall operating efficiency. Further, by modulating line pressure to correspond closely with torque output demand, unnecessary shock in the application of clutch and brake members will be eliminated with a consequent increase in the useful life of such members. Thus when operating under conditions of moderate engine torque output, a reduction ratio transition made with a high clutch or brake servo pressure will result in sudden and abrupt engagement of the friction grip means with a noticeable bump witnessable by the vehicle occupants. On the other hand, a lower servo pressure as is automatically available in applicant's control system results in a less abrupt application of the friction grip members and an appropriately smoother ratio transition.

*Pressure regulator*

The control pressure for varying the pump eccentricity, as noted above, is main line pressure modified by a pressure regulator mechanism designated generally at B which includes a pressure regulator valve 162 and a modulator 163.

The regulator valve, as shown in Figures 2 and 6, includes a plurality of lands 164, 166, 167, 168 and 169 which are respectively connected by reduced portions 171, 172, 173 and 174.

The regulator valve 162 is slidably retained within a ported valve casing 176. Valve 162 is resiliently urged to right, as viewed in Figure 6, so that land 169 abuts against a shoulder 177 of the casing bore. Main line pressure from passage 144 is fed to the casing bore through a port 179 in the valve casing 176. A longitudinal dead end passage 182 is formed in the valve body and communicates near one end with a radial passage 183 formed in the reduced portion 172 of the valve body. The other end of the passage 182 is open to the casing bore and port 179. Thus main line pressure is delivered through port 179 to longitudinal passage 182 and thence to radial passage 183. When valve 162 is held in its right-hand position, the reduced valve portion 172 communicates with port 178 and delivers main line pressure to pump control passage 149 which, as noted above, delivers pressure to increase pump output by increasing the control ring eccentricity relative to the rotor. The left-ward travel of valve 162 is limited by the abutting of a valve stem 184 against the valve casing. In its left-hand position, the reduced portion 172 of the valve body now registers with a port 186 which delivers main line pressure to pump control passage 151 which shifts the control ring to reduce the output of the pump as noted above. Thus the right-hand position of valve 162 may be termed the high pump pressure position while the left-hand position may be referred to as the low pump pressure position. It is to be noted that when valve 162 is in the high pressure position, reduced portion 173 is in registry with port 186, thus dumping the fluid in passage 151 through an exhaust port 187 and back to sump 139 through passage 188. Similarly passage 149 is exhausted through reduced portion 171, port 189 and passage 191 when the valve is in its low pressure position.

During the movement of the regulator valve, lands 164 and 168, respectively, restrict the size of exhaust ports 189 and 187, thereby creating back pressures in pump chambers 152 and 153 against which the main line pressure must act in varying the pump eccentricity. In this way positive pressures are maintained on both sides of the pump control ring and more accurate control of pump output pressure is maintained than would be possible with the uncontrolled exhausting of chambers 152 and 153.

Regulator valve 162 may also assume a position intermediate the aforementioned right and left hand positions. In an intermediate position as shown in Figure 6, lands 166 and 167 block ports 178 and 186 such that fluid under pressure neither flows to nor from pump control passages 149 and 151. In this condition, the position of control ring 133 and the consequent pump output are stabilized.

A spring 192 seated in valve casing 176 biases against land 169 of valve 162 and constantly urges the valve to its right-hand or high pressure position. The main line pressure from port 179 acts within the bore of casing 176 to move valve 162 to the left or low pressure position against the force of spring 192. Thus fundamentally we have a substantially constant force acting to condition the front pump for maximum output and in opposition to said force the self-delivered variable pump pressure tending to reduce the pump capacity.

It has previously been noted that the pressure output levels from pump 131 are varied in accordance with the torque loads impressed on the friction grip devices, i. e. clutches or brakes. Therefore, since the pressure regulator valve 162 controls the output of pump 131, the valve must be in part controllable by forces indicative of the torque loads to be variously transmitted by any such grip means. As thus far described, the control of regulator valve 162 is non-responsive to the various torque loads imposed on the friction grip means. The mechanism and forces which make the valve so responsive will now be considered:

*Modulator*

Valve stem 184 has a projection 193 which extends beyond the valve casing 176 and contacts the free end 196 of a control lever 194 pivoted at 197. The control lever 194 is part of modulating mechanism B. The modulating mechanism exerts varying forces, dependent on operator demand as reflected in ratio selection and engine loading, on the regulator valve 162 through control lever 194 to modify the position of valve 162. The mechanism 163 includes a vacuum modulator 201 and a hydraulic modulator 221 commonly supported within a modulator housing 202 which includes a recessed cover 203. Supported in air-tight relation between housing 202 and cover 203 is a flexible diaphragm 204. Centrally carried by the diaphragm on either side thereof are reinforcing discs 205. Mounted within cover 203 is a calibrated spring 207 which abuts against disc 205 forcing the diaphragm to the right, as shown in Figure 2.

The hydraulic modulator 221 is slidably mounted within a central bore 222 formed in housing 202. The hydraulic modulator is an hydraulically expansible link which includes a pair of pistons 223 and 224, one sliding within the other. The hydraulic modulator is so disposed as to have piston 223 constantly engage control lever 194 intermediate its free and pivoted ends. It will be seen that when the pistons 223 and 224 are contracted to act as a solid link, as shown in Figure 2, the force of spring 207 moves diaphragm 204 and the pistons to the right, thus moving control lever 194 in a clockwise direction about pivot 197 to supplement the force of spring 192 in moving the regulator valve to the right or high pump pressure position. To modify or reduce the effect of spring 207, a chamber 226, defined by cover 203 and diaphragm 204, is connected by a conduit 208 to an engine intake manifold, not shown. Thus under conditions of high manifold vacuum, which is indicative of low torque load on the engine, chamber 226 is under low or sub-atmospheric pressure while atmospheric pressure acts on the right side of diaphragm 204 through an atmospheric vent 230. The result is a differential pressure force which reduces the net force of spring 207 on the regulator valve and so contributes to a reduction in the output capacity of pump 131. Conversely, under conditions of low vacuum, or high torque load on the engine, the pressure in chamber 226 approaches atmospheric and spring 207 exerts its maximum force to retain pump 131 in a high output condition. Thus by superimposing the vacuum modulator on regulator valve 162, the valve and thus the front pump capacity are made responsive to the torque load on the engine which accordingly reflects the torque load impressed on the friction grip means.

The hydraulic modulator has been provided to insure sufficiently high servo pressure when the transmission is in any of the high torque ratio conditions, i. e. low, manual or automatic; or reverse. It is again apparent that under such high torque conditions high gripping capacity is required of the grip devices, in this instance the low and reverse bands, to avoid slipping. Since a vehicle transmission is operated under conditions of maximum torque for a relatively small percentage of the overall operating time, it is much more efficient in point of engine horsepower consumption to provide a mechanism such as the hydraulic modulator which is operative only during these limited periods to maintain the pump at maximum output and which is otherwise inoperative.

Openings 231 and 232 are formed in walls of pistons 223 and 224 of the hydraulic actuator to admit fluid to expand the piston assembly. Main line pressure from an accumulator 251 is delivered through a passage 233 to bore 222. As pressure enters chamber 236 between the pistons, piston 224 moves diaphragm 204 outward until it strikes the recessed portion 237 of cover 203. The force of the expanded hydraulic modulator pistons thereafter acts through the control lever 194 to move the regulator valve 162 to its high pump capacity or right hand position.

Fluid is supplied to passage 233 from an accumulator 251 to charge the hydraulic actuator whenever the manual valve 101 is in its Low or Reverse positions. In either manual Low or Reverse, main line pressure from passage 144 is delivered to accumulator passage 127 around the reduced portion 111 of the manual valve.

With the selector lever in the Drive range, manual valve land 106 blocks off main line pressure from passage 144 while land 103 uncovers port 116 of main line pressure passage 117 which provides pressure through passages 239, 240 and 127 to supply the accumulator and energize the hydraulic modulator. However, main line pressure from passage 239 is adapted to be cut off and accumulator 251 exhausted through an exhaust port 351 in shift valve casing 341 when the shift valve 331 upshifts the transmission into high range. Thus the hydraulic modulator action is automatically eliminated when the transmission shifts to the high range of operation.

With the direct drive clutch D applied, the transmission is within that range of operation where the servo pressure required to transmit the driving torque through the transmission without slippage is relatively low, therefore provision has been made to facilitate the movement of the regulator valve to reduce the output of pump 131 when clutch D is applied. Clutch servo pressure is delivered through passage 121 to regulator valve casing 176 where it enters the reduced portion 174 of the regulator valve from port 242. The cross-sectional area of land 169 is greater than that of land 168, therefore when clutch pressure enters the space between the lands a pressure differential force will act on land 169 to supplement the force of main line pressure in the casing bore in moving the regulator valve to its low pump pressure or left hand position.

Accumulator 251 shown particularly in Figure 8, is interposed between the manual valve 101 and the hydraulic actuator 221 to cushion the application of the low and reverse bands, thus lessening the shock that would otherwise attend a high servo pressure shift. Thus the accumulator acts as a surge chamber for the hydraulic modulator. Line pressure is delivered from passage 127 to a chamber 252 of the accumulator where the pressure moves an accumulator valve 253 against the force of a spring 254. Valve 253 as so moved permits fluid to flow through an orifice 256 to a passage 257. The orifice-reduced fluid pressure in passage 257 then flows to passage 233 where it divides, part going to the hydraulic modulator and part to an accumulator surge chamber 258. As pressure quickly rises, the oil fills chamber 258 and moves accumulator piston 259 against the force of springs 261 and 262 until piston stop 263 abuts against the accumulator casing. At this time the "door-check" action is completed and the higher pressure in passage 233 is fully applied to the hydraulic modulator.

When shifting from low or reverse to neutral or drive, means is provided for quickly exhausting the hydraulic modulator and the accumulator. A check valve 264 is biased by a light spring 266 so as to close a surge chamber exhaust port 267. In low and reverse, main line pressure in chamber 252 plus the force of spring 266 are sufficient to maintain valve 264 in a closed position. However, when main line pressure is cut off from chamber 252, the accumulated pressure in surge chamber 258 opens the check valve and quickly dumps hydraulic modulator and accumulator pressure through passages 127 and shift valve exhaust port 351.

To prevent damage to the hydraulic control system in the event that regulator valve 162 should fail to regulate properly or should pump 131 be otherwise uncontrollable, a pop-off valve 271, Figures 2 and 9 has been inserted in main pressure line 144. Valve 271 is of the spindle type and includes a pair of lands 272 and 273 connected by a portion 274 of reduced cross-section. The valve is slidably retained within a valve casing 276. The travel of the valve within the casing 276 is limited in either direction by stems 277 and 278 projecting respectively from lands 272 and 273. A stop 279 is provided in casing 276 against which stem 278 may abut and against which a spring 280 seats. The other end of spring 280 biases against land 273 and moves the valve to the left until valve stem 277 abuts against the valve casing. The valve casing includes exhaust ports 281 and 282 and pressure port 283. Pressure port 283 connects to main line pressure passage 144. The valve lands are so spaced that port 283 is always in registry with the reduced space between the lands. Exhaust port 282 is controlled by land 273. To make the valve responsive to main line pressure, the cross-sectional area of land 273 is made greater than that of land 272. The area differential and force of spring 280 are so calibrated that when mail line pressure exceeds, say 200 pounds, the valve will be shifted to the right until land 273 uncovers exhaust port 282 to dump excess pressure. Exhaust port 281 is merely to prevent a build-up of pressure in the bore of casing 276 due to the leakage of fluid past land 272. Pressure dumped through exhaust ports 281 and 282 is returned to sump 139.

Rear pump

In order to provide an automatic transmission in which ratio changes are fundamentally responsive to vehicle speed, it is necessary to provide a mechanism which generates a control force which is proportional to that speed. Such mechanisms are not broadly new as it attested by multitude of tailshaft governing mechanisms. In hydraulic control systems generally similar to that presently proposed, it is known to provide fluid pressure from an engine driven pump to supply fluid for hydraulic ratio control devices and to control ratio changes through a tailshaft responsive governing mechanism. However, with such systems it is considered mandatory to also provide a tailshaft driven pump which will at least supply lubricant to the transmission to prevent damage thereto in the event the front pump fails to operate as would occur with an engine failure. In the present invention, a novel arrangement has been devised whereby a tailshaft driven pump is capable of functioning either as a governor or as a lubricant supply source depending on the requirements of the system. In this way the need for a separate governing mechanism has been eliminated and the governing function incorporated in an otherwise necessary device, to wit, a tailshaft driven pump.

It is well known that a constant displacement pump pumping through an orifice will yield a pressure which is responsive to the speed of the shaft which is driving the pump. It is therefore possible to utilize the combination of such a pump and orifice as a governing device. It is in this manner that applicant utilizes rear pump 291, i. e. as a governor to control a ratio shift in response to tailshaft speed or as lubricant supply source in the event of an inoperative engine supply pump. During normal operation, the variable pressure from the rear pump is delivered to a shift valve 331 which is spring biased against the force of the pump-governor pressure.

The tailshaft driven pump 291 as shown in Figures 1 and 2, may be any well known type of constant displacement pump. As is best seen in Figure 1, pump 291 is driven by the transmission output shaft 67. The tailshaft pump draws oil from sump 139 through a passage 292 and discharges fluid under pressure into a passage 293. The operation of the pump-governor 291 in the hydraulic system will be considered below in relation to the various mechanisms functionally associated therewith.

Tow valve

In the event the front pump should fail to supply lubricant to the transmission, which situation would arise whenever the vehicle engine is not operative, as when the vehicle is being towed or pushed, a tow valve 301 has been provided to operate in conjunction with pump 291 to insure that the transmission will have sufficient lubricant to prevent damage.

Valve 301, shown in Figure 7, includes lands 302, 303 and 304 which are connected by reduced portions 306 and 307. The valve is slidably retained within a ported valve casing 308. Casing 308 includes a mail line pressure inlet port 309 which is in constant registry with a chamber 311 defined by the right end of the valve and the casing. The casing also includes rear pump pressure inlet ports 312 and 313 which communicate respectively with the reduced portions 306 and 307 of the valve. Outlet ports 314 and 316 are also formed in the valve casing. The valve body 301 is partially hollowed to receive therewithin a spring 317. Spring 317 seats against a pin stop 318 in the casing so as to bias the valve to the right.

As will be seen in Figure 7, as long as the front pump is operating its output pressure delivered through passage 144 will enter chamber 311 and shift the valve to the left against the force of a spring 317 permitting rear pump oil to flow from passage 293 into the valve body around the reduced portion 306 of the valve to outlet port 316. In the left hand position, valve land 303 uncovers port 316 and blocks port 314 permitting fluid from port 312 to flow around reduced valve portion 306 into a passage 319 and ultimately to return to sump 139. An orifice 321 is provided in passage 319 and, as previously noted, by causing the fluid output from pump 291 to flow through such an orifice the pressure level in passage 293 will be proportional to the speed of tailshaft 67. Thus when valve 301 is in its left-hand position, rear pump 291 will function as a governor and deliver a control pressure which is proportional to vehicle speed.

In the event the front pump is rendered inoperative, howsoever, the pressure in chamber 311 is eliminated and spring 317 shifts the tow value 301 to the right causing valve land 303 to block port 316 preventing the rear pump from discharging through orifice 321. At the same time, port 314 is uncovered by land 303 enabling rear pump oil from passage 293 to flow around the reduced portion 307 of the valve and into main pressure line 144 from branch passage 323. In this position of valve 301 the rear pump no longer functions as a governor but instead functions as a main line supply pump and thus insures an adequate supply of lubricant for the transmission.

*Shift valve*

Figure 3:
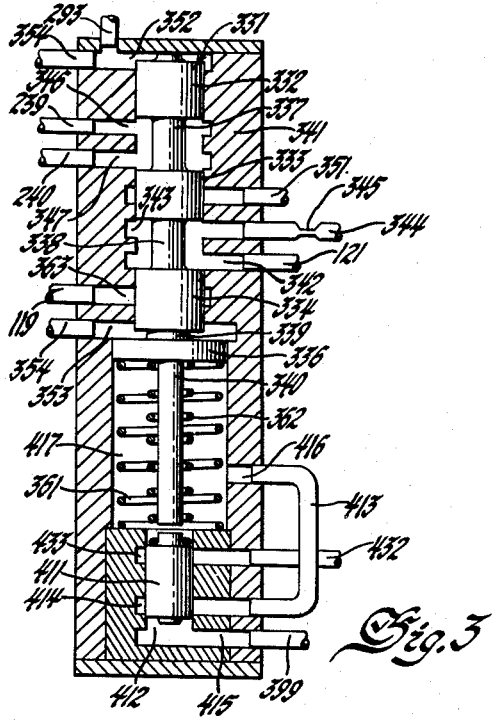
Figure 3 is a detail of the shift valve and regulator plug.

In order to obtain automatic ratio changes in the planetary gearset, a shift valve 331 responsive to the control pressure of governor-pump 291 is provided. The shift valve directly controls direct-drive clutch application and exhaust as well as low band exhaust. As seen in Figures 2 and 3, the shift valve is of the spindle type and includes lands 332, 333, 334 and 336 which are connected by reduced portions 337, 338 and 339. A projection 340 extends from land 336. Valve 331 is slidably housed in a valve casing 341 having bores of varying diameters to accommodate various sized lands. Casing 341 has a plurality of ports formed therein which will be considered in respect to the functions and mechanisms served thereby.

Valve 331 is resiliently biased in the low speed position which is that shown in Figures 2 and 3. In this position the low band is applied and the direct drive clutch is released.

Clutch passage 121 connects with a casing port 342 which is in registry with an exhaust port 343 around the reduced valve portion 338. Exhaust port 343 returns fluid to sump through a passage 344. In the low speed position, reduced valve portion 337 is in registry with ports 346 and 347. Port 346 connects with main line pressure passage 239 while port 347 connects with passage 240. Passage 240 in turn communicates with a port 349 in the manual valve casing. Thus main line pressure is delivered around the reduced portion 111 of the manual valve to the accumulator feed passage 127. When, on the other hand, valve 331 shifts to its high speed position, land 332 blocks pressure port 346 while land 333 uncovers exhaust port 351. Therefore in high speed range accumlator 251 is exhausted through the shift valve and the hydraulic modulator is rendered inoperative, as already noted.

Casing 341 also includes a pair of control ports 352 and 353. Port 352 delivers control pressure from the tailshaft pump through passage 293 and branched passage 354 to the upper end of the valve casing where it acts against valve land 332 to move the valve downwardly. Port 353 delivers the same control pressure through passages 293 and 354 between valve lands 334 and 336. The cross-sectional area of land 336 is larger than that of land 334, consequently, the control pressure tends to move the valve downwardly. Thus whenever control pressure from the tailshaft pump is available it acts simultaneously on lands 332 and 336 of the shift valve to shift the transmission to the high speed ratio.

Opposing the downward movement of valve 331 are springs 361 and 362. Spring 361 seats within a spring chamber 417 and biases against land 336 with a constant rate. Spring 362 also biases against land 336 but the force exerted by this spring is variable. Spring 362 seats against a movable member 411 known as a regulator plug which is slidably retained within a ported bore 412 of the valve casing. The forces which control the movement of regulator plug 411 will be subsequently considered. It is to be observed at this junction, however, that the point at which valve 331 shifts is variable in accordance with variable resistance offered by spring 362.

Main line pressure to apply clutch D is delivered to a port 363 from passage 119. With the valve in its upper or low speed position, land 334 blocks off port 363. With the valve shifted to the high speed position, land 333 blocks clutch exhaust port 343 and land 334 uncovers main pressure port 363 to deliver main line pressure around reduced valve portion 338 to clutch passage 121.

In order to prevent the indefinite positioning or "hunting" of the shift valve between its low and high speed positions as the result of the opposing control pressure and spring forces, a snap over characteristic has been built into the valve. This feature is achieved by making the cross-sectional area of land 334 larger than that of land 333. As the governor-pump control pressure moves the valve downwardly, land 334 cracks open port 363 permitting main line pressure to enter the space between lands 333 and 334 and due to the area differential between the lands the line pressure supplements the force of the control pressure and snaps the valve to its high speed position.

*Throttle valve*

In order to maintain a measure of operator control over the point at which the shift valve under governor influence will shift the transmission into a different speed ratio, an operator controlled throttle valve 381 is provided.

The primary purpose of the throttle valve is to deliver a regulated pressure proportional to accelerator loading to the shift valve 331 and which pressure acts on said valve to oppose the pump-governor pressure otherwise tending to upshift the valve. In this manner, the shift valve is not only responsive to vehicle speed, but also to operator torque demand. Throttle valve 381, as shown in Figure 11, includes lands 382, 383 and 384 having reduced sections 386 and 387 therebetween. A radial passage 388 is formed in section 386 and communicates with a longitudinal passage 389. Valve 381 is freely movable in bore 391 of a valve casing 390. A spring retainer 392 is slidably mounted within a large bore 393 of the valve casing and includes a projection 394 extending beyond said casing. Seated within retainer 392 is a spring 396, the other end of which biases against the left end of the throttle valve. Various ports are formed in casing 390 including an inlet port 397 connected to main pressure line 239 and an outlet port 398 connected to a passage 399. Throttle valve pressure from passage 399 is fed back to valve casing 390 by a passage 400 and reenters bore 391 through a port 401. By such a feed-back effect, the valve responds to its own delivered pressure and so opposes the action of spring 396 in moving the valve to the right with a force proportional the degree of throttle opening.

The longitudinal passage 389 also communicates with bore 391. Initially valve 381 is biased by spring 396 in its extreme right-hand position in which position reduced portion 386 and radial passage 388 communicate with main line pressure port 397 while land 383 blocks flow to outlet port 398. When line pressure becomes available, in line 239, on the starting the engine, the pressure is transmitted through valve passages 388 and 389 to bore 391 causing pressure to react against land 384 and thus urging valve 381 to the left against the force of spring 396. In moving valve 381 to the left, ports 397 and 398 are in registry around reduced valve portion 387 which permits a metered line pressure to flow into outlet passage 399. The throttle valve pressure can be varied by varying the force of spring 396 which is accomplished by varying the position of spring retainer 392 in bore 393. A throttle pedal actuated lever 402 shown in Figure 2 through a raised portion 403 engages with projection 394 of the spring retainer and in accordance with the amount of throttle opening moves spring retainer 392 to the right to compress spring 396 and thereby increases the resistance against movement toward the left hand or pressure cut-off position of the valve. Consequently, under light throttle loading, spring loading is a minimum and throttle valve pressure through feed-back passage 400 tends to move the throttle valve to the left such that land 384 blocks or restricts outlet port 398. Under heavy throttle loadings, on the other hand, the increased rate of spring 396 moves the valve so that land 384 uncovers port 398 to admit line pressure to passage 399 which delivers throttle valve pressure beneath the regulator plug 411.

Regulator plug 411 has been provided in the shift valve casing 341 in order to facilitate the throttle valve control over the point of shift of shift valve 331. The regulator plug opposes the movement of shift valve 331 through spring 362 in proportion to operator torque demand as indicated by the throttle pressure from throttle valve 381. Shift valve casing 341 has a port 415 which admits throttle valve pressure to bore 412 beneath the regulator plug.

As previously noted, by varying the position of plug 411 the resistance of spring 362 to the movement of the shift valve likewise varies. As the throttle valve pressure increases with heavy throttle loading, plug 411 moves up in bore 412 to increase the rate of spring 362. A by-pass passage 413 communicates with casing 341 through ports 414 and 416. As the regulator plug is moved upwardly within bore 412 under heavy throttle loading port 414 is uncovered permitting throttle valve pressure, per se, to enter spring chamber 417 and act directly against land 336. Thus, depending on the degree of throttle loading, shift valve 331 will be retained in the low speed position until the governor-pump pressure reaches a sufficiently high value to overcome the force springs 361 and 362 or the force of springs 361 and 362 coupled with that of throttle valve pressure acting on land 336.

*Detent valve*

While the throttle valve delivers a pressure proportional to throttle opening which varies the point of upshift in accordance with throttle loading, a second valve has been provided which enables the operator once this upshift has occurred to downshift the transmission below a certain car speed. A detent valve 421 performs such a downshift or "kickdown" function in response to throttle actuation. The detent valve, as illustrated in Figures 2 and 10, includes a pair of lands 422 and 423 having a portion 424 of reduced cross-section therebetween. Extending respectively from the ends of the valve are projections 426 and 427. The valve 421 is freely slidable in a ported valve casing 428.

The casing includes an inlet port 429 which receives pressure from throttle valve pressure passage 400 and which port is adapted under certain circumstances to deliver this pressure around the reduced valve portion 424 to an outlet port 431. Port 431 communicates with the shifter valve casing through a passage 432 and delivers detent valve pressure to shift valve casing port 433. Clutch pressure from passage 121 is delivered to the right side of detent valve casing 428 where such pressure acts against land 423 to move the valve to the left or exhaust position. In this position land 422 uncovers an exhaust port 434 which registers with port 433 through reduced valve portion 424 to exhaust passage 432. A spring 436 seats within casing 428 and biases against land 423 to shift the valve to the left when clutch pressure is not available. To shift valve 421 to the right or downshift position, the throttle pedal is moved beyond its wide open position where a raised portion 404 of throttle-controlled lever 402 is adapted to engage a valve projection 426 and move the valve to the right against the force of spring 436 and the clutch pressure on land 423. In the right position land 422 blocks exhaust port 434 and land 423 uncovers inlet port 429 thereby charging passage 432 with what is substantially main line pressure from the throttle valve.

When shift valve 331 is in its descended or high speed position, shift valve projection 340 positively engages regulator plug 411 and maintains the plug in the lower portion of bore 412. In this position the plug uncovers a port 433 which admits detent valve pressure from passage 432 into spring chamber 417. The pressure so admitted to the spring chamber acts the large area of land 336 to raise the shift valve and consequently downshift the gear-set into a low speed-high torque ratio.

To prevent possible damage to the vehicle engine or the transmission in the event of an attempted downshift at too high a vehicle speed, the cross-sectional areas of the shift valve lands as well as springs 361 and 362 have been calibrated so that above a given car speed, e. g. 60 miles per hour, the force of the control pressure from governor-pump 291 acting on lands 332 and 336 will exceed the total of those forces tending to move the valve to its low speed position and a downshift will be rendered impossible until the vehicle speed is sufficiently reduced.

*Transition valve*

In automatic transmissions utilizing hydraulically controlled ratio changes through a gearset, it is most desirable to provide a timing mechanism which insures that the changes of power flow are suitaby synchronized to eliminate or minimize ratio transition shock.

Figure 4:
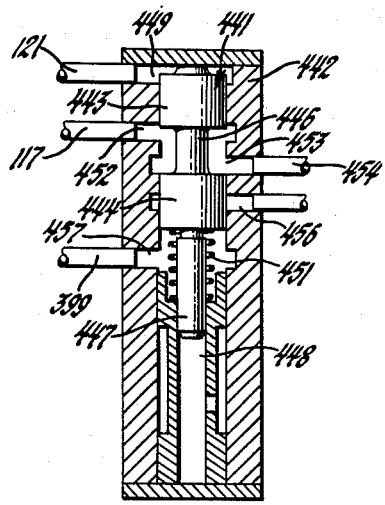
Figure 4 is a detail of the transition valve.

In order to insure the smooth transition from band (gear reduction) drive to clutch (direct) drive and vice versa, a transition valve 441, shown in Figure 4, has been provided. This valve insures that one of the friction grip members will be released only at such time as the other is prepared to assume the drive. Likewise the transition valve eliminates the possibility of both friction members endeavoring to fully assume the drive at the same time. The transition valve 441 is slidably retained in a casing 442 and includes lands 443 and 444 connected by portion 446 of reduced cross-section. A stem 447 projects from land 444 and slides within a reduced bore 448 of the valve casing. The valve casing communicates with the clutch apply passage 121 at port 449 such that whenever the shift valve 331 admits line pressure to passage 121 the pressure within the clutch apply servo is felt on top of the transition valve land 443. A spring 451 seats within the valve casing and biases against land 444 urging valve 441 into its upper or low band apply position as shown in Figures 2 and 4. Main line pressure from passage 117 is admitted to the valve casing through a port 452. When the valve is in its upper position by virtue of spring 451, port 452 delivers main line pressure around the reduced portion 446 of the valve to an outlet port 453 which through a passage 454 delivers the main line pressure to apply the low band L. An exhaust port 456 is blocked by land 444 when valve 441 is in its upper or band apply position. Throttle valve pressure is admitted to the valve casing through a port 457 and acts on land 444 to supplement the force of spring 451 in holding valve 451 in its upper position. Land 444 blocks port 457 when the valve is in its lower position and uncovers exhaust port 456 to exhaust band pressure line 454. It is apparent that the valve area upon which the throttle valve pressure acts is reduced by the amount of the cross-sectional area of stem 447 and therefore there is an area differential advantage in favor of land 443 upon which clutch apply pressure acts. The transition valve will not shift to exhaust the low band simultaneously with the admission of clutch apply pressure to passage 121 by the shift valve. Since the clutch apply servo must take up the clearance between the clutch plates, full line pressure is not realized in passage 121 until the servo has ceased expanding which is approximately the time when the clutch members are to be fully engaged. The spring 451 is calibrated such that its force coupled with that of throttle valve pressure acting on the lower face of land 444 will be overcome to shift the transition valve to exhaust the band servo substantially at the same moment when pressure in passage 121 has reached sufficient value to fully apply the clutch. Thus by preventing premature release of the low band, an undesirable freewheeling effect is eliminated and which would otherwise occur if the band were released before the clutch was applied.

Not only does the transition valve have a timing function during upshift, that is, from gear to direct drive, but likewise during a throttle controlled downshift. If the operator depresses the accelerator pedal to downshift the transmission for greater acceleration or power, it is requisite to a smooth ratio change that the clutch does not release before the band is ready to be applied. A quick release of the clutch without the band being applied would in effect neutralize the transmission and the engine under the heavy throttle loading would race or accelerate purposelessly. Not only would the engine race without purpose, but even more objectionable would be the jerk or bump sensation which the occupants would experience when the band would again couple the engine to the transmission. To prevent the sudden release of the clutch, an orifice 345 is provided in the clutch exhaust passage 344 leading from the shift valve casing. In this manner, clutch D will be uncoupled at a rate determined by the size of orifice 345 and which rate is related to the rate at which the low band is being applied. Thus means have been provided whereby, upon an operator enforced downshift, the timing of clutch release and band application will be such as to avoid undue shock which would otherwise be occasioned by uncoupling and re-coupling an accelerating engine between different transmission gear ratios.

To obtain reverse drive the operator through the transmission selector lever moves manual valve 101 to its extreme left position. In this position main line pressure from port 113 is admitted around reduced valve portion 108 to port 122 and to the reverse band passage 123 to apply a reverse brake or band R. At the same time, manual valve land 104 moves to the left and blocks the flow of main line pressure to ports 116 and 118 and instead opens these ports to exhaust through a port 120 and a passage 125. As a consequence low band L and clutch D are released. With the reverse band R applied the short pinions 53 react about the annulus gear 56 and drive the carrier 59 and output shaft 67 in the reverse direction.

*Lubrication and oil cooling*

The lubricating system and oil cooling mechanism used in the present transmission are same as that shown and described in Kelley Serial No. 83,618 filed March 26, 1949, which may be referred to for a detailed description of said devices. For present purposes, a brief description of the mechanism will suffice.

Oil circulating through converter C leaves the converter through a passage 148 having an orifice 460 thereon. The orifice reduces the pressure of the oil for lubricating all of the moving parts in the transmission. The oil is directed to these parts through passages, not shown, in the various shafts with the excess returning to sump 139 after completing its circuit.

Heat, developed in the torque converter during ordinary operation, is rapidly dissipated. Under extended and severe driving conditions, however, the oil temperature may rise above the most desirable operating level. For such instance, an oil cooler O of the water jacket type is provided. It is adapted to be interposed in the engine cooling system between the radiator outlet and the suction side of the water pump.

Whenever the oil temperature exceeds, say 240° F., a thermostat 462 in the lubrication oil line closes a by-pass valve 463, causing the heated oil to be by-passed through a cooler inlet passage 464. After being cooled, the oil returns to its regular circuit through a passage 466 which connects to a sump passage 467. Since oil temperature seldom rises above 240°, the by-pass valve 463 is normally open thereby cutting the oil cooler out of the lubrication line.

Briefly, the operation of the above-described device is as follows: With the manual valve 101 in the drive (D) position the transmission will be in a low-low condition. That is, both the torque converter and the planetary gear set will be in reduction or low condition. As the vehicle accelerates and the speed of the tail shaft reaches a predetermined value the fluid pressure from the rear pump 291 will move the shift valve 331 to a position, previously described, in which the brake member L maintaining the planetary gear set in low gear, is released. At the same time, the valve causes the direct drive clutch D to be applied thereby locking the engine output shaft directly to the transmission tail shaft to provide direct drive through the transmission.

As already described in detail above, the time at which the aforementioned shift from reduction to direct drive takes place is variable not only in response to speed but also in response to torque demand. The throttle controlled valve 381 provides a pressure which acts on shift valve 331 with a force proportional to engine loading in opposition to the pressure from pump-governor 291. In other words, under conditions of high torque demand, the upshifting of the transmission to direct drive will be delayed until the governor pressure overcomes the abnormal pressure opposing the upshifting of valve 331.

Additionally, it is to be noted that throttle actuated means is provided whereby the transmission may be downshifted to a lower speed-higher torque condition when extra performance is required. For this purpose a detent valve 421 has been provided.

A very important provision in the subject control mechanism is the tow valve 301 which under the influence of main line pressure conditions the rear pump 291 to act either as a governor and to thereby control the actuation of valve 331 or, upon the failure of the main line pressure, causes the rear pump to be connected in series with the main line pressure system to supply lubricant to the transmission to prevent damage thereto in the event of engine failure.

In order to provide main line pressure at a pressure level commensurate with the torque load being impressed on the friction gripping devices a pressure regulator mechanism B is provided. Mechanism B, as previously described, varies line pressure automatically with changes in manifold vacuum which are indicative of the torque load on the transmission. Further, mechanism B varies the line pressure when high torque conditions, such as low and reverse drives, are manually pre-selected. In this way a smoother operating more efficient transmission is provided.

While a specific control system has been shown and described for the purpose of most simply setting forth the subject invention it is apparent that numerous variations and modifications can be made within the intended scope of the invention.

I claim:

1. In a fluid controlled power transmission assembly for delivering the power of a vehicle engine to the vehicle wheels at variable speeds and torques, an output shaft drivingly connected to said wheels, a fluid torque converter having an input member driven by said engine and an output member, a change speed gear unit driven by said output member and driving said output shaft, a first fluid pressure system including a pump driven by said converter input member, a clutch member adapted to directly connect said engine and said output shaft, gear drive elements actuatable to provide reduction drive between said output member and said output shaft, fluid pressure operated mechanisms in said system for actuating said clutch and said gear drive elements, a valve member for controlling the selective actuation of said mechanisms, a second fluid pressure system including an output shaft driven pump, fluid from said second system being adapted to shift the valve member in accordance with output shaft speed, a second valve member responsive to the fluid pressure of said first system for connecting said systems in series upon the loss of pressure in said first system.

2. In a fluid pressure controlled power transmission assembly including a power input shaft, a power output shaft, a change speed gear unit connecting said shafts, a fluid operated friction grip device to connect said shafts for direct drive, a second fluid operated friction grip device to connect said shafts for reduction drive, a first fluid pressure system for supplying fluid pressure to said grip devices, said system including a pump driven by the input shaft, a valve member for controlling the selective actuation of said grip devices, a second fluid pressure system including an output shaft driven pump, said pump being adapted to discharge through an orifice to provide a pressure responsive to output shaft speed, said second system being adapted to actuate said valve member in response to output shaft speed, a valve element intermediate the output shaft pump and the orifice, pressure from said first system being adapted to move said valve element to maintain output shaft pump discharge through the orifice, a resilient member acting in opposition to said first system for moving said valve to block the discharge through the orifice and to deliver said output pump pressure to said first system.

3. In a fluid pressure controlled power transmission assembly including a power input shaft, a power output shaft, a change speed gear unit connecting said shafts, a first fluid operated friction grip device to connect said shafts for direct drive, a second fluid operated friction grip device to connect said shafts for reduction drive, a first fluid pressure system for supplying fluid pressure to said grip devices, said system including a pump driven by the input shaft, a valve member for controlling the selective actuation of said grip devices, a second fluid pressure system including an output shaft driven pump, said second system being adapted to shift said valve member in response to the speed of the output shaft, a second valve member responsive to the fluid pressure of said first system only to connect said systems in series upon the loss of pressure in said system.

4. In a fluid pressure controlled power transmission assembly including a power input shaft, a power output shaft, a change speed gearing unit connecting said shafts, a plurality of fluid operated grip devices for varying the speed and torque ratios through said unit, a fluid pressure system to provide fluid for said grip devices, said system including a pump driven by the input shaft, a valve member for selectively controlling the actuation of said devices, an hydraulic governing mechanism driven by said output shaft, fluid pressure from the governing mechanism being adapted to shift said valve member in response to output shaft speed, and a fluid pressure responsive valve element adapted to hydraulically connect said governing mechanism in series with said fluid pressure system.

5. In a fluid controlled power transmission assembly for delivering the power of a vehicle engine to the vehicle wheels at variable speeds and torques, an output shaft drivingly connected to said wheels, a fluid torque converter having an input member driven by said engine and an output member, a change speed gear unit driven by said output member and driving said output shaft, a first fluid pressure system including a pump driven by said converter input member, a clutch member adapted to directly connect said engine and said output shaft, gear drive elements actuatable to provide reduction drive between said output member and said output shaft, fluid pressure operated mechanisms in said system for actuating said clutch and said gear drive elements, a valve member for controlling the selective actuation of said mechanisms, a second fluid pressure system including an output shaft driven pump, said pump being adapted to discharge through an orifice to provide a pressure proportional to output shaft speed, said pressure being adapted to actuate said valve member, a valve element intermediate the output shaft pump and the orifice, pressure from said first system being adapted to move said valve element to maintain output pump discharge through the orifice, and a resilient member acting in opposition to said first system to block the discharge through said orifice and to deliver the output pump discharge to said first system.

6. In a motor vehicle power transmission mechanism having a plurality of speed ratio controlling devices, fluid pressure operated means for selectively operating said devices, a pump for supplying fluid under pressure to said pressure operated means, said pump being of the type which responds to its own self-delivered pressure to vary its own pumping capacity, control means for modifying the self-delivered pressure effect in varying pump capacity, said control means including a valve shiftable between a first position and a second position, said valve being adapted to deliver pump pressure to increase pump capacity in said first position and to decrease pump capacity in said second position, resilient means biasing said valve in said first position, pump pressure urging said valve to said second position, a torque responsive device acting on said resilient means to reduce the force thereof and manually controlled means to maintain said valve in said first position.

7. In a motor vehicle power transmission mechanism having a plurality of speed ratio controlling devices including a direct drive clutch, fluid pressure operated means for selectively operating said devices, a pump for supplying fluid under pressure to said pressure operated means, said pump being of the type which responds to its own self-delivered pressure to vary its own pumping capacity, control means for modifying said self-delivered pressure effect, said control means including a valve shiftable between a first position and a second position, said valve being adapted to deliver pump pressure to increase pump capacity in said first position and to decrease pump capacity in said second position, resilient means biasing said valve in the first position, pump output pressure urging said valve to the second position, a vacuum operated device acting on said resilient means to reduce the force thereof, a passage connecting said direct drive clutch to the valve whereby clutch pressure tends to move said valve to said second position and manually controlled means to maintain said valve in said first position.

8. In a motor vehicle power transmission mechanism having a plurality of speed ratio controlling devices, fluid pressure operated means for selectively operating said devices, a pump for supplying fluid under pressure to said pressure operated means, said pump being of the type which responds to its own self-delivered pressure to vary its own pumping capacity, control means for modifying the self-delivered pressure effect in varying pump capacity, said control means including a valve shiftable between a first position and a second position, said valve being adapted to deliver pump pressure to increase pump capacity in said first position and to decrease pump capacity in said second position, resilient means biasing said valve in said first position, pump pressure urging said valve to said second position, an engine vacuum operated device acting on said resilient means to reduce the force thereof, manually controlled means to maintain said valve in said first position, said valve being positionable intermediate its first and second positions to stabilize pump capacity.

9. In a fluid pressure controlled power transmission assembly including a power input shaft, a power output shaft, a change speed gear unit connecting said shafts, a first fluid operated friction grip device to connect said shafts for direct drive, a second fluid operated friction grip device to connect said shafts for reduction drive, a first fluid pressure system for supplying fluid pressure to said grip devices, said system including a pump driven by the input shaft, a valve member for controlling the selective actuation of said grip devices, a second fluid pressure system including an output shaft driven pump, said second system being adapted to shift said valve member in response to the speed of the output shaft, a second valve member responsive to the fluid pressure of said first system to connect said systems in series upon the loss of pressure in said first system, said input shaft driven pump being of the type which responds to its own self-delivered pressure to vary its own pumping capacity, control means for modifying said self-delivered pressure effect in varying pump capacity, said control means including a regulator valve shiftable between a first position and a second position, said regulator valve being adapted to deliver pump pressure to increase pump capacity in said first position and to decrease pump capacity in said second position, resilient means biasing the regulator valve in the first position, pump pressure urging said valve to the second position, a torque responsive device acting on said resilient means to reduce the force thereof, and manually controlled means to maintain said valve in said first position.

10. In a fluid pressure controlled power transmission assembly including a power input shaft, a power output shaft, a change speed gear unit connecting said shafts, a first fluid operated friction grip device to connect said shafts for direct drive, a second fluid operated friction grip device to connect said shafts for reduction drive, a first fluid pressure system for supplying fluid pressure to said grip devices, said system including a pump driven by the input shaft, a valve member for controlling the selective actuation of said grip devices, a second fluid pressure system including an output shaft driven pump, said second system being adapted to shift said valve member in response to the speed of the output shaft, a second valve member responsive to the fluid pressure of said first system to connect said systems in series upon the loss of pressure in said first system, said input shaft driven pump being of the type which reponds to its own self-delivered pressure to vary its own pumping capacity, control means for modifying said self-delivered pressure effect in varying pump capacity, said control means including a regulator valve shiftable between a first position and a second position, said regulator valve being adapted to deliver pump pressure to increase pump capacity in said first position and to decrease pump capacity in said second position, resilient means biasing the regulator valve in the first position, pump pressure urging the regulator valve to the second position, an engine vacuum operated device acting on the resilient means to reduce the force thereof, a passage connecting the first fluid operated grip device to the valve whereby the fluid pressure in said device tends to move said regulator valve to said second position and manually controlled means to maintain said regulator valve in said first position.

11. In a fluid pressure controlled power transmission assembly including a power input shaft, a power output shaft, a change speed gearing unit connecting said shafts, a plurality of fluid operated grip devices for varying the speed and torque ratios through said unit, a fluid pressure system to provide fluid for said grip devices, said system including a pump driven by the input shaft, a valve member intermediate said pump and said grip devices for selectively controlling the actuation of said devices, an hydraulic governing mechanism driven by said output shaft, fluid pressure from the governing mechanism being adapted to shift said valve member in response to output shaft speed, and a fluid pressure responsive valve element adapted to hydraulically connect said governing mechanism in series with said fluid pressure system, said pump being of the type which responds to its own self-delivered pressure to vary its own pumping capacity, control means for modifying the self-delivered pressure effect in varying pump capacity, said control means including a valve element shiftable between a first position and a second position, said valve element being adapted to deliver pump pressure to increase pump capacity in said first position and to decrease pump capacity in said second position, resilient means biasing said valve element in the first position, pump pressure urging the valve element to the second position, a vacuum operated device acting on said resilient means to reduce the force thereof, said valve element being positionable intermediate its first and second positions to stabilize pump capacity and manually controlled means to maintain the valve element in said first position.

12. In a fluid controlled power transmission assembly for delivering the power of a vehicle engine to the vehicle wheels at variable speeds and torques, an output shaft drivingly connected to said wheels, a fluid torque converter having an input member driven by said engine and an output member, a change speed gear unit driven by said output member and driving said output shaft, a first fluid pressure system including a pump driven by said converter input member, clutch elements within said unit adapted for engagement to provide direct drive between said engine and said output shaft, gear drive elements actuatable to provide reduction drive between said output member and said output shaft, fluid pressure operated mechanisms in said system for actuating said elements, a valve member for controlling the selective actuation of said mechanisms, a second fluid pressure system including an output shaft driven pump, said pump being adapted to discharge through an orifice to provide a pressure proportional to output shaft speed, said pressure being adapted to actuate said valve member, a valve element intermediate the output shaft pump and the orifice, pressure from said first system for moving said valve element to maintain output pump discharge through the orifice, and a resilient member acting on said valve element in opposition to the pressure of said first system to block the discharge through said orifice and to deliver the output pump discharge to said first system, said converter driven pump being of the type which responds to its own self-delivered pressure to vary its own pumping capacity, control means for modifying the self-delivered pressure effect in varying pump capacity, said control means including a regulator valve shiftable between a first position and a second position, the regulator valve being adapted to deliver pump pressure to increase pump capacity in said first position and to decrease pump capacity in said second position, resilient means biasing the regulator valve in said first position, pump pressure urging said valve to said second position, a vacuum operated device acting on said resilient means to reduce the force thereof and manually controlled means to maintain said regulator valve in said first position.

13. In a motor vehicle power transmission mechanism having a plurality of speed ratio controlling devices including a reduction drive brake member, fluid pressure operated means for selectively operating said devices, a pump for supplying fluid under pressure to said pressure operated means, said pump being of the type which responds to its own self-delivered pressure to vary its own pumping capacity, control means for modifying said self-delivered pressure effect, said control means including a valve shiftable between a first position and a second position, said valve being adapted to deliver pump pressure to increase pump capacity in said first position and to decrease pump capacity in said second position, resilient means biasing said valve in the first position, pump output pressure urging said valve to the second position, a vacuum operated device acting on said resilient means to reduce the force thereof, and an hydraulic modulator responsive to the fluid pressure from said pump and adapted to maintain said valve in said first position upon application of the brake member.

14. In a motor vehicle power transmission mechanism having a plurality of speed ratio controlling devices including a direct drive clutch and a reduction drive brake, fluid pressure operated means for selectively operating said devices, a pump for supplying fluid under pressure to said pressure operated means, said pump being of the type which responds to its own self delivered pressure to vary its own pumping capacity, control means for modifying said self-delivered pressure effect, said control means including a valve shiftable between a first position and a second position, said valve being adapted to deliver pump pressure to increase pump capacity in said first position and to decrease pump capacity in said second position, resilient means biasing said valve in the first position, pump output pressure urging said valve to the second position, a vacuum operated device acting on said resilient means to reduce the force thereof, a passage connecting said direct drive clutch to the valve whereby clutch pressure tends to move said valve to said second position, and an hydraulic modulator responsive to the fluid pressure from said pump and adapted to maintain said valve in said first position upon application of said brake.

15. In a motor vehicle power transmission mechanism having a plurality of speed ratio controlling devices including a reduction drive brake member, fluid pressure operated means for selectively operating said devices, a pump for supplying fluid under pressure to said pressure operated means, said pump being of the type which responds to its own self-delivered pressure to vary its own pumping capacity, control means for modifying said self-delivered pressure effect, said control means including a valve shiftable between a first position and a second position, said valve being adapted to deliver pump pressure to increase pump capacity in said first position and to decrease pump capacity in said second position, resilient means biasing said valve in the first position, pump output pressure urging said valve to the second position, a vacuum operated device acting on said resilient means to reduce the force thereof, an hydraulic modulator responsive to the fluid pressure from said pump and adapted to maintain said valve in said first position upon application of the brake, and means responsive to the speed of said vehicle for rendering said hydraulic modulator inoperative.

16. In a motor vehicle power transmission mechanism having a plurality of speed ratio controlling devices including a direct drive clutch and a reduction drive brake, fluid pressure operated means for selectively operating said devices, a pump for supplying fluid under pressure to said pressure operated means, said pump being of the type which responds to its own self-delivered pressure to vary its own pumping capacity, control means for modifying said self-delivered pressure effect, said control means including a valve shiftable between a first position and a second position, said valve being adapted to deliver pump pressure to increase pump capacity in said first position and to decrease pump capacity in said second position, resilient means biasing said valve in the first position, pump output pressure urging said valve to the second position, a vacuum operated device acting on said resilient means to reduce the force thereof, a passage connecting said direct drive clutch to the valve whereby clutch pressure tends to move said valve to said second position, an hydraulic modulator responsive to the fluid pressure from said pump and adapted to maintain said valve in said first position when said brake is applied, and means adapted to render the hydraulic modulator inoperative upon the application of the clutch.

17. In a motor vehicle power transmission mechanism having a plurality of speed ratio controlling devices including a direct drive clutch and a reduction drive brake, fluid pressure operated means for selectively operating said devices, a pump for supplying fluid under pressure to said pressure operated means, said pump being of the type which responds to its own self-delivered pressure to vary its own pumping capacity, control means for modifying said self-delivered pressure effect, said control means including a valve shiftable between a first position and a second position, said valve being adapted to deliver pump pressure to increase pump capacity in said first position and to decrease pump capacity in said second position, resilient means biasing said valve in the first position, pump output pressure urging said valve to the second position, a vacuum operated device adapted to move said valve toward the second position, a passage connecting said direct drive clutch to the valve whereby clutch pressure tends to move said valve to said second position, an hydraulic modulator responsive to the fluid pressure from said pump and adapted to maintain said valve in said first position when said brake is applied, a vehicle speed responsive governing mechanism, a shift valve actuatable by said mechanism to control the selective actuation of said grip devices, the shift valve being adapted to render said hydraulic modulator inoperative.

18. In a fluid pressure controlled power transmission assembly including a power input shaft, a power output shaft, a change speed gear unit connecting said shafts, a first fluid operated friction grip device to connect said shafts for direct drive, a second fluid operated friction grip device to connect said shafts for reduction drive, a first fluid pressure system for supplying fluid pressure to said grip devices, said system including a pump driven by the input shaft, a valve member for controlling the selective actuation of said grip devices, a second fluid pressure system including an output shaft driven pump, said second system being adapted to shift said valve member in response to the speed of the output shaft, a second valve member responsive to the fluid pressure of said first system to connect said systems in series upon the loss of pressure in said first system, the input shaft driven pump being of the type which responds to its own self-delivered pressure to vary its own pumping capacity, control means for modifying said self-delivered pressure effect in varying pump capacity, said control means including a regulator valve shiftable between a first position and a second position, said regulator valve being adapted to deliver pump pressure to increase pump capacity in said first position and to decrease pump capacity in said second position, resilient means biasing the regulator valve in the first position, pump pressure urging said valve to the second position, a vacuum device being adapted to move said regulator valve toward said second position, and an hydraulic modulator responsive to the fluid pressure from said pump for maintaining said regulator valve in the first position upon the application of the second fluid operated grip means.

19. In a fluid pressure controlled power transmission assembly including a power input shaft, a power output shaft, a change speed gear unit connecting said shafts, a first fluid operated friction grip device to connect said shafts for direct drive, a second fluid operated friction grip device to connect said shafts for reduction drive, a first fluid pressure system for supplying fluid pressure to said grip devices, said system including a pump driven by the input shaft, a valve member for controlling the selective actuation of said grip devices, a second fluid pressure system including an output shaft driven pump, said second system being adapted to shift said valve member in response to the speed of the output shaft, a second valve member responsive to the fluid pressure of said first system to connect said systems in series upon the loss of pressure in said system, said input shaft driven pump being of the type which responds to its own self-delivered pressure to vary its own pumping capacity, control means for modifying said self-delivered pressure effect in varying pump capacity, said control means including a regulator valve shiftable between a first position and a second position, said regulator valve being adapted to deliver pump pressure to increase pump capacity in said first position and to decrease pump capacity in said second position, resilient means biasing the regulator valve in the first position, pump pressure urging the regulator valve to the second position, a vacuum operated device acting on the resilient means to reduce the force thereof, a passage connecting the first fluid operated grip device to the valve whereby the fluid pressure in said device tends to move said regulator valve to said second position and an hydraulic modulator responsive to the fluid pressure from said pump for maintaining said valve in the first position upon the application of the second fluid operated grip means.

20. In a fluid pressure controlled power transmission assembly including a power input shaft, a power output shaft, a change speed gearing unit connecting said shafts, a plurality of fluid operated grip devices for varying the speed and torque ratios through said unit, a fluid pressure system to provide fluid for said grip devices, said system including a pump driven by the input shaft, a valve member intermediate said pump and said grip devices for selectively controlling the actuation of said devices, an hydraulic governing mechanism driven by said output shaft, fluid pressure from the governing mechanism being adapted to shift said valve member in response to output shaft speed, and a pressure responsive valve element adapted to hydraulically connect said governing mechanism in series with said fluid pressure system, said pump being of the type which responds to its own self-delivered pressure to vary its own pumping capacity, control means for modifying the self-delivered pressure effect in varying pump capacity, said control means including a valve element shiftable between a first position and a second position, said valve element being adapted to deliver pump pressure to increase pump capacity in said first position and to decrease pump capacity in said second position, resilient means biasing said valve element in the first position, pump pressure urging the valve element to the second position, a vacuum operated device acting on said resilient means to reduce the force thereof, said valve element being positionable intermediate its first and second positions to stabilize pump capacity, an hydraulic modulator responsive to the fluid pressure from said pump and adapted to maintain said valve in the first position upon the application of one of said grip devices and means responsive to the fluid pressure from the governing mechanism for rendering said hydraulic modulator inoperative.

21. In a fluid controlled power transmission assembly for delivering the power of a vehicle engine to the vehicle wheels at variable speeds and torques, an output shaft drivingly connected to said wheels, a fluid torque converter having an input member driven by said engine and an output member, a change speed gear unit driven by said output member and driving said output shaft, a first fluid pressure system including a pump driven by said converter input member, clutch elements within said unit adapted for engagement to provide direct drive between said engine and said output shaft, gear drive elements actuatable to provide reduction drive between said output member and said output shaft, fluid pressure operated mechanisms in said system for actuating said elements, a valve member for controlling the selective actuation of said mechanisms, a second fluid pressure system including an output shaft driven pump, said pump being adapted to discharge through an orifice to provide a pressure proportional to output shaft speed, said pressure being adapted to actuate said valve member, a valve element intermediate the output shaft pump and the orifice, pressure from said first system being adapted to move said valve element to maintain output pump discharge through the orifice, and a resilient member acting in opposition to said first system to block the discharge through said orifice and to deliver the output pump discharge to said first system, said converter driven pump being of the type which responds to its own self-delivered pressure to vary its own pumping capacity, control means for modifying the self-delivered pressure effect in varying pump capacity, said control means including a regulator valve shiftable between a first position and a second position, the regulator valve being adapted to deliver pump pressure to increase pump capacity in said first position and to decrease pump capacity in said second position, resilient means biasing the regulator valve in said first position, pump pressure urging said valve to said second position, a vacuum operated device acting on said resilient means to reduce the force thereof, an hydraulic modulator responsive to the fluid pressure from said pump and adapted to maintain said valve in said first position in reduction drive and means adapted to render the hydraulic modulator inoperative in direct drive.

22. In a motor vehicle power transmission mechanism having a plurality of speed ratio controlling devices including a direct drive clutch and a reduction drive brake, fluid pressure operated means for selectively operating said devices, a pump for supplying fluid under pressure to said pressure operated means, said pump being of the type which responds to its own self-delivered pressure to vary its own pumping capacity, control means for modifying said self-delivered pressure effect, said control means including a valve shiftable between a first position and a second position, said valve being adapted to deliver pump pressure to increase pump capacity in said first position and to decrease pump capacity in said second position, resilient means biasing said valve in the first position, pump output pressure urging said valve to the second position, a vacuum operated device adapted to move said valve toward the second position, a passage connecting said direct drive clutch to the valve whereby clutch pressure tends to move said valve to said second position, an hydraulic modulator responsive to the fluid pressure from said pump and adapted to maintain said valve in said first position when said brake is applied, a vehicle speed responsive governing mechanism, a shift valve actuatable by said mechanism to control the selective actuation of said grip devices, the shift valve being actuatable to render said hydraulic modulator inoperative, and a manually controlled member for independently actuating said hydraulic modulator.

23. In a motor vehicle power transmission mechanism having a plurality of speed ratio controlling devices, fluid pressure operated means for selectively operating said devices, a pump for supplying fluid under pressure to said pressure operated means, said pump being of the type which responds to its own self-delivered pressure to vary its own pumping capacity, control means for modifying said self-delivered pressure effect, said control means including a valve shiftable between a first position and a second position, said valve being adapted to deliver pump pressure to increase pump capacity in said first position and to decrease pump capacity in said second position, resilient means biasing said valve in the first position, pump output pressure urging said valve to the second position, a vacuum operated device acting on said resilient means to reduce the force thereof, and an hydraulic modulator responsive to the fluid pressure of said pump and adapted to maintain said valve in said first position upon application of one of said controlling devices.

24. In a fluid pressure controlled power transmission assembly including a power input shaft, a power output shaft, a change speed gear unit connecting said shafts, a first fluid operated friction grip device to connect said shafts for direct drive, a second fluid operated friction grip device to connect said shafts for reduction drive, a first fluid pressure system for supplying fluid pressure to said grip devices, said system including a pump driven by the input shaft, a valve member for controlling the selective actuation of said grip devices, a second fluid pressure system including an output shaft driven pump, said second system being adapted to shift said valve member in response to the speed of the output shaft, a second valve member responsive to the fluid pressure of said first system to connect said systems in series upon the loss of pressure in said first system, the input shaft driven pump being of the type which responds to its own self-delivered pressure to vary its own pumping capacity, control means for modifying said self-delivered pressure effect in varying pump capacity, said control means including a regulator valve shiftable between a first position and a second position, said regulator valve being adapted to deliver pump pressure to increase pump capacity in said first position and to decrease pump capacity in said second position, resilient means biasing the regulator valve in the first position, pump pressure urging said valve to the second position, a vacuum device being adapted to move said regulator valve toward said second position, an hydraulic modulator responsive to the fluid pressure from said pump for maintaining said valve in the first position upon the application of the second fluid operated grip means, and a manual valve for independently actuating said hydraulic modulator.

25. In a motor vehicle power transmission mechanism having a plurality of speed ratio controlling devices including a reduction drive brake member, fluid pressure operated means for selectively operating said devices, a pump for supplying fluid under pressure to said pressure operated means, said pump being of the type which responds to its own self-delivered pressure to vary its own pumping capacity, control means for modifying said self-delivered pressure effect, said control means including a valve shiftable between a first position and a second position, said valve being adapted to deliver pump pressure to increase pump capacity in said first position and to decrease pump capacity in said second position, resilient means biasing said valve in the first position, pump output pressure urging said valve to the second position, a vacuum operated device acting on said resilient means to reduce the force thereof, an hydraulic modulator responsive to the fluid pressure from said pump adapted to maintain said valve in said first position upon application of the brake, means responsive to the speed of said vehicle for rendering said hydraulic modulator inoperative, and a manually controlled member for independently acuating said hydraulic modulator.

References Cited in the file of this patent

UNITED STATES PATENTS

| | | |
|---|---|---|
| 2,204,872 | Thompson | June 18, 1940 |
| 2,205,470 | Dunn et al. | June 25, 1940 |
| 2,223,716 | Bojesen | Dec. 3, 1940 |
| 2,291,424 | Wichorek | July 28, 1942 |
| 2,323,601 | Hobbs | July 6, 1943 |
| 2,332,593 | Nutt et al. | Oct. 26, 1943 |
| 2,433,484 | Roth | Dec. 30, 1947 |
| 2,516,203 | Greenlee | July 25, 1950 |
| 2,516,208 | Hasbany | July 25, 1950 |
| 2,576,336 | Farkas | Nov. 27, 1951 |
| 2,609,706 | Jandasek | Sept. 9, 1952 |
| 2,629,265 | Dodge | Feb. 24, 1953 |
| 2,630,895 | McFarland | Mar. 10, 1953 |
| 2,633,035 | Livermore | Mar. 31, 1953 |